United States Patent
Echeverri

(10) Patent No.: US 11,230,445 B2
(45) Date of Patent: Jan. 25, 2022

(54) DEVICE FOR RESUSPENSION OF SOLIDS IN SLURRY PIPE TRANSPORT

(71) Applicant: FLSmidth A/S, Valby (DK)

(72) Inventor: Luis Fernando Echeverri, Tuscon, AZ (US)

(73) Assignee: FLSmidth A/S, Valby (DK)

( * ) Notice: Subject to any disclaimer, the term of this patent is extended or adjusted under 35 U.S.C. 154(b) by 0 days.

(21) Appl. No.: 16/977,713

(22) PCT Filed: Mar. 1, 2019

(86) PCT No.: PCT/IB2019/051683
§ 371 (c)(1),
(2) Date: Sep. 2, 2020

(87) PCT Pub. No.: WO2019/167024
PCT Pub. Date: Sep. 6, 2019

(65) Prior Publication Data
US 2021/0053775 A1 Feb. 25, 2021

Related U.S. Application Data

(60) Provisional application No. 62/638,001, filed on Mar. 2, 2018.

(51) Int. Cl.
*F16L 57/06* (2006.01)
*B65G 53/52* (2006.01)
*F15D 1/02* (2006.01)

(52) U.S. Cl.
CPC ......... *B65G 53/521* (2013.01); *B65G 53/523* (2013.01); *F15D 1/02* (2013.01); *F16L 57/06* (2013.01)

(58) Field of Classification Search
CPC .......... F16L 57/06; F15D 1/02; B65G 53/521; B65G 53/523
(Continued)

(56) References Cited

U.S. PATENT DOCUMENTS

| | | | | |
|---|---|---|---|---|
| 1,289,154 | A | * 12/1918 | Girtanner et al. | ... B65G 53/523 406/193 |
| 2,276,883 | A | * 3/1942 | Schon | ...... C10G 1/06 196/133 |

(Continued)

FOREIGN PATENT DOCUMENTS

| | | |
|---|---|---|
| DE | 307855 C | 3/1916 |
| DE | 19852869 A1 | 5/2000 |

(Continued)

OTHER PUBLICATIONS

The International Search Report and Written Opinion dated May 31, 2019, 15 pages.

*Primary Examiner* — Patrick F Brinson
(74) *Attorney, Agent, or Firm* — Jeffrey A. Sharp

(57) ABSTRACT

An internal inclined sub-channel, or ramp device, for suspending and/or re-suspending solids within a pipeline system during transport of slurry may be provided to various components of the slurry transport system to control or reduce localized and severe wear that often occurs in slurry pumps. Embodiments of the ramp device may be adequately configured to alter slurry multiphase flow patterns and/or disrupt traditional moving/sliding bed regime phenomena. Embodiments of the ramp device may be adequately configured to raise coarse abrasive particulates from bottom portions of a slurry pipe section—where a higher concentration and/or a larger presence of coarser particles may be present. Embodiments of the ramp device may be installed in proximity of and/or upstream of slurry pumps to prevent occurrences of severe localized wear at the inner diameter of the pump suction side wall around the bottom or 6 o'clock position.

18 Claims, 19 Drawing Sheets

(58) Field of Classification Search
USPC .......................... 138/37, 39, 110; 285/16, 55
See application file for complete search history.

(56) References Cited

U.S. PATENT DOCUMENTS

| | | | |
|---|---|---|---|
| 4,461,498 A | | 7/1984 | Kunsman |
| 4,606,556 A | * | 8/1986 | Metzger .................. F16L 57/06 |
| | | | 285/16 |
| 4,621,953 A | * | 11/1986 | McGuth .................. F16L 57/06 |
| | | | 138/39 |
| 4,653,777 A | * | 3/1987 | Kawatsu .............. B65G 53/523 |
| | | | 285/16 |
| 4,684,155 A | * | 8/1987 | Davis .................. B65G 53/523 |
| | | | 138/139 |
| 5,188,396 A | * | 2/1993 | Calvin .................... F16L 57/06 |
| | | | 285/16 |
| 5,301,984 A | | 4/1994 | Farris |
| 6,799,608 B1 | * | 10/2004 | Koshika ................ F16L 43/001 |
| | | | 138/145 |
| 2014/0190272 A1 | | 7/2014 | Laird et al. |

FOREIGN PATENT DOCUMENTS

| | | |
|---|---|---|
| GB | 2088694 A | 6/1982 |
| WO | 00/76891 A1 | 12/2000 |

* cited by examiner

Homogeneous flow

Heterogeneous flow, full particle suspension

Heterogeneous flow, sliding bed

DEVICE FOR RESUSPENSION OF SOLIDS IN SLURRY PIPE TRANSPORT

CROSS-REFERENCE TO RELATED APPLICATIONS

This is an International Application which claims the benefit of U.S. Provisional Patent Application No. 62/638,001, filed 2 Mar. 2018, the contents of which are hereby incorporated by reference, in their entirety, for any and all purposes, as if fully set forth herein.

FIELD OF THE INVENTION

This application pertains to industrial equipment, and more importantly, improvements to components used for slurry pipe transport.

Particularly disclosed are embodiments of a novel device and method for suspending and/or re-suspending slurry within a slurry pipe during its transport. Embodiments of the novel device and method may improve uniformity of the flow concentration profile at the suction region of slurry pumps and reduce wear to the pump components in slurry transport systems.

It will become apparent from this disclosure that the device configurations and the method described herein might offer various advantages and benefits not yet available with conventional slurry transport technologies increasing the service life of slurry pumps.

BACKGROUND OF THE DISCLOSURE

With conventional slurry transport technologies, wear from abrasive slurry may occur within a slurry transport pipe and/or slurry pumps—particularly at the bottom or 6 o'clock (i.e., downwards) position, due to gravity. Moreover, wear may occur in the same area due to moving/sliding bed regime phenomena.

The wear may occur to slurry pumps when flow arriving to the pump suction nozzle is within the moving/sliding bed regime. A higher concentration and/or a larger presence of coarser particles located at the bottom combines with suction recirculation resulting in severe local wear at the inner diameter of the suction side wall around the 6 o'clock location (See FIGS. 6-7).

As slurry is transported through pipelines, there is a tendency for solid particles in the pipeline to settle due to the gravitational force, and this produces a higher concentration of solid particles at the bottom of a pipe. In cases where flow velocity falls below a critical limit, fluid forces are unable to maintain the solids in suspension. This is especially true with coarser particles, which tend to settle and form a moving bed at the bottom of the pipeline that slides with lower velocity than the rest of the flow. In the worst cases, this moving/sliding bed can even become stationary.

Turning to FIG. 8, an explanation for the wear at the 6 o'clock position discussed above is depicted. Wear to slurry pump components may occur when the flow arriving into the pump suction nozzle is within the moving bed regime (where a higher concentration and/or a higher presence of coarser particles are located at the bottom of the suction pipe). The moving bed regime combines with the suction recirculation or leakage that invariably occurs in centrifugal pumps, resulting in a localized and severe wear mechanism.

Several solutions have been proposed for resuspension of solids in slurry pipelines. One approach involves "pre-swirling" or the provision of "spiral vanes" to induce vorticity (see, for example, U.S. Pat. No. 1,608,547; US-2013/0202426A1). Another approach involves providing inclined side walls and contraction of cross-sectional area of piping (see, for example, U.S. Pat. No. 6,428,268).

New solutions are proposed herein, in an attempt to overcome problems regarding severe wear in slurry pumps and improve upon the aforementioned prior concepts for re-suspending solids. There currently exists a need for slurry pipe transport technologies which might improve pump service life and maintain or improve slurry transport efficiency without necessarily changing slurry transport dynamics or employing expensive pump materials.

OBJECTS OF THE INVENTION

It is, therefore, an object of some embodiments to circumvent the aforementioned drawbacks associated with settling of solids in pipelines and consequential pump wear in prior art slurry transport systems.

It is another object of some embodiments to eliminate or mitigate wear failures that might occur with centrifugal slurry pumps used in mining, oil sands, and other industrial operations.

It is another object of some embodiments to eliminate or mitigate wear failures that might result in severe localized wear at the inner diameter (ID) of a suction liner, throatbush, or adjustable wear ring (in case of FLSmidth® KREBS pumps); the severe localized wear usually being located near the lowest point—typically referred to as the "6 o'clock" position.

It is another object of some embodiments to induce hydraulic resuspension of solids which may have settled at the bottom of slurry pipe lines feeding centrifugal slurry pumps, thereby eliminating or mitigating local wear at the inside diameter of the suction liner or wear ring near the 6 o'clock position.

It is another object of some embodiments to enable an internal inclined sub-channel or "ramp device" to be installed in a slurry pipeline—including, but not limited to, any location along a suction pipe used to feed slurry pumps, spools, or alternatively, a suction pipe entrance at a sump.

These and other objects of the invention will become apparent from the drawings and description herein.

Although every object of the invention is believed to be attained by at least one embodiment of the invention, there is not necessarily any one embodiment of the invention that achieves all of the objects of the invention.

BRIEF SUMMARY OF THE INVENTION

A novel device designed for resuspending solids in pipelines, or ramp device, is disclosed. The ramp device may comprise a structure as substantially shown in the appended drawings. Each mechanical feature shown plays an important part in influencing hydrodynamics within a pipeline and the pumps of a slurry transport system.

A method for transporting slurry may involve providing the novel ramp device to a component of a slurry transport system and then moving slurry through the slurry transport system across the ramp device. A method of reducing wear to a component of a slurry transport system may comprise removing a component therefrom, and providing a replacement component which comprises a ramp device having a structure as substantially shown in the appended drawings. In some embodiments, the method may comprise the step of providing a component for use with a slurry transport system, wherein the component comprises a structure as substantially depicted and described in the accompanying drawings. In some embodiments, the method may comprise the step of providing a component comprising a structure as substantially depicted and described in the accompanying drawings to a slurry transport system, and installing said component. The structure is preferably configured to alter flow of particulate (e.g., suspend or re-suspend coarse abrasive particles) and reduce wear.

BRIEF SUMMARY OF THE DRAWINGS

To complement the description which is being made, and for the purpose of aiding to better understand the features of the invention, a set of drawings illustrating new and novel methods and apparatus for improving industrial slurry transport processes is attached to the present specification as an integral part thereof, in which the following has been depicted with an illustrative and non-limiting character. It should be understood that like reference numbers used in the drawings (if any are used) may identify like components.

FIG. 1 is a cross-sectional top view of a component of a slurry transport system including an attached ramp device of the present invention.

FIG. 2 is an end view of a component of a slurry transport system including an attached ramp device of the present invention, viewed from the entrance direction of slurry into the component.

FIG. 3 is a cross-sectional side view of a component of a slurry transport system including an attached ramp device of the present invention.

FIG. 4 is an upper perspective view of a component of a slurry transport system including an attached ramp device of the present invention, viewed from the exit direction of slurry when leaving the component.

FIG. 5 is an upper perspective view of a component of a slurry transport system including an attached ramp device of the present invention, viewed from the entrance direction of slurry into the component.

FIG. 6 illustrates wear around the bottom of the inner diameter of an FLSmidth® KREBS adjustable wear ring.

FIG. 7 suggests wear around the bottom of the inner diameter of a throat bush or suction liner in a conventional slurry pump.

FIG. 15 shows how a polymeric (e.g., rubber, urethane, plastic) liner may be employed within an outer metal frame. The ramp device may be molded in the polymeric liner as shown, although it could alternatively be separately provided and affixed to the inside of a component of a slurry transport system as a "non-integral" supplemental device. The polymeric liner may be added to an existing metal frame (e.g., as an aftermarket service), without limitation.

FIG. 13 is an isometric view of a component of a slurry transport system including a ramp device of the present invention formed integrally with a polymeric component interior liner, viewed from the entrance direction of slurry into the component.

FIG. 14 is an isometric view of a component of a slurry transport system including a ramp device of the present invention formed integrally with a polymeric component interior liner, viewed from the exit direction of slurry when leaving the component.

FIG. 15 is an isometric cutaway view of a component of a slurry transport system including a ramp device of the present invention formed integrally with a polymeric component interior liner.

In the following, the invention will be described in more detail with reference to drawings in conjunction with exemplary embodiments.

DETAILED DESCRIPTION

While the present invention has been described herein using exemplary embodiments of a slurry transport pipe component comprising a novel ramp device, and methods of manufacturing and operating the same, it should be understood that numerous variations and adaptations will be apparent to those of ordinary skill in the field from the teachings provided herein.

The detailed embodiments shown and described in the text and figures should not be construed as limiting in scope; rather, all provided embodiments should be considered to be exemplary in nature. Accordingly, this invention is only limited by the appended claims.

The inventor has recognized a novel and heretofore unappreciated method of transporting slurry within a pipe or component of a slurry transport system using a novel ramp device.

An internal inclined sub-channel or "ramp device" may be provided to redistribute flow within a pipe section as depicted in the appended drawings. This ramp device can be fabricated using a polymer, metal, or ceramic wear-resistant material as required. A combination of the aforementioned materials may be used to fabricate the ramp device.

In some practical embodiments, slurry/particulates may, in some embodiments, comprise minerals processing concentrate, sludge, slurry, tailings, waste, or other material to be conveyed, without limitation.

Figure 9:
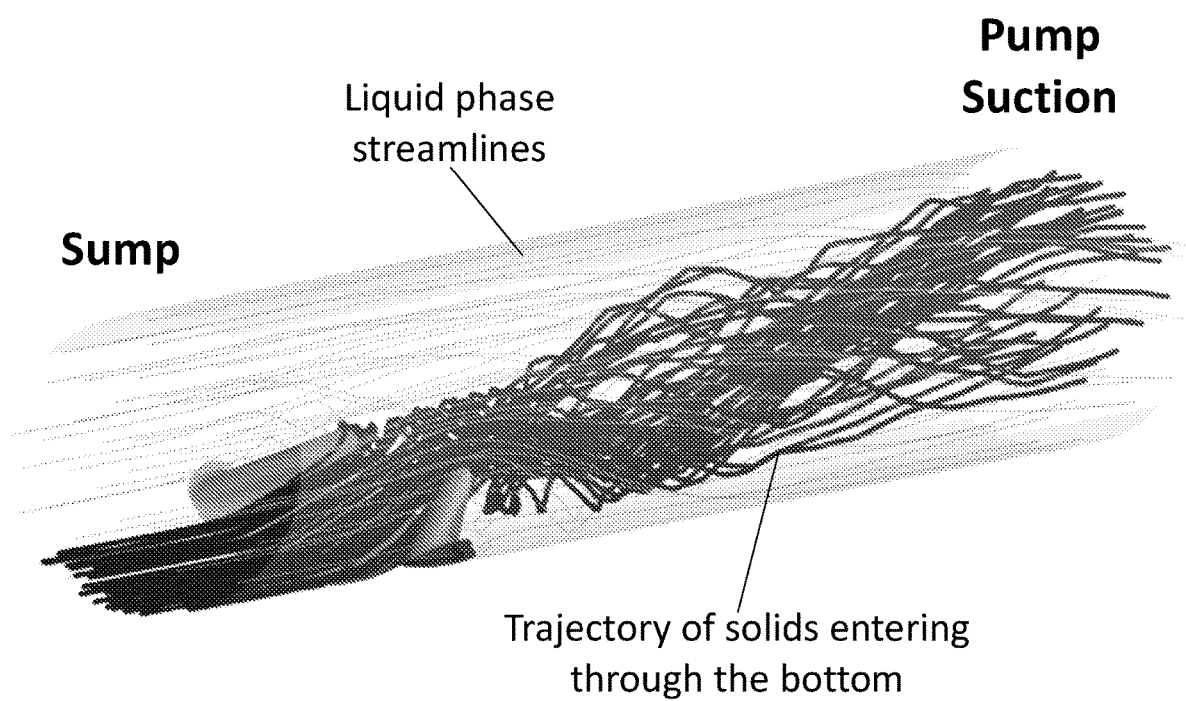
FIG. 9 shows a computational fluid dynamics (CFD) prediction of the trajectory of particulates within a moving/sliding bed passing by an open subchannel ramp device according to one possible embodiment disclosed herein.
Figure 10:
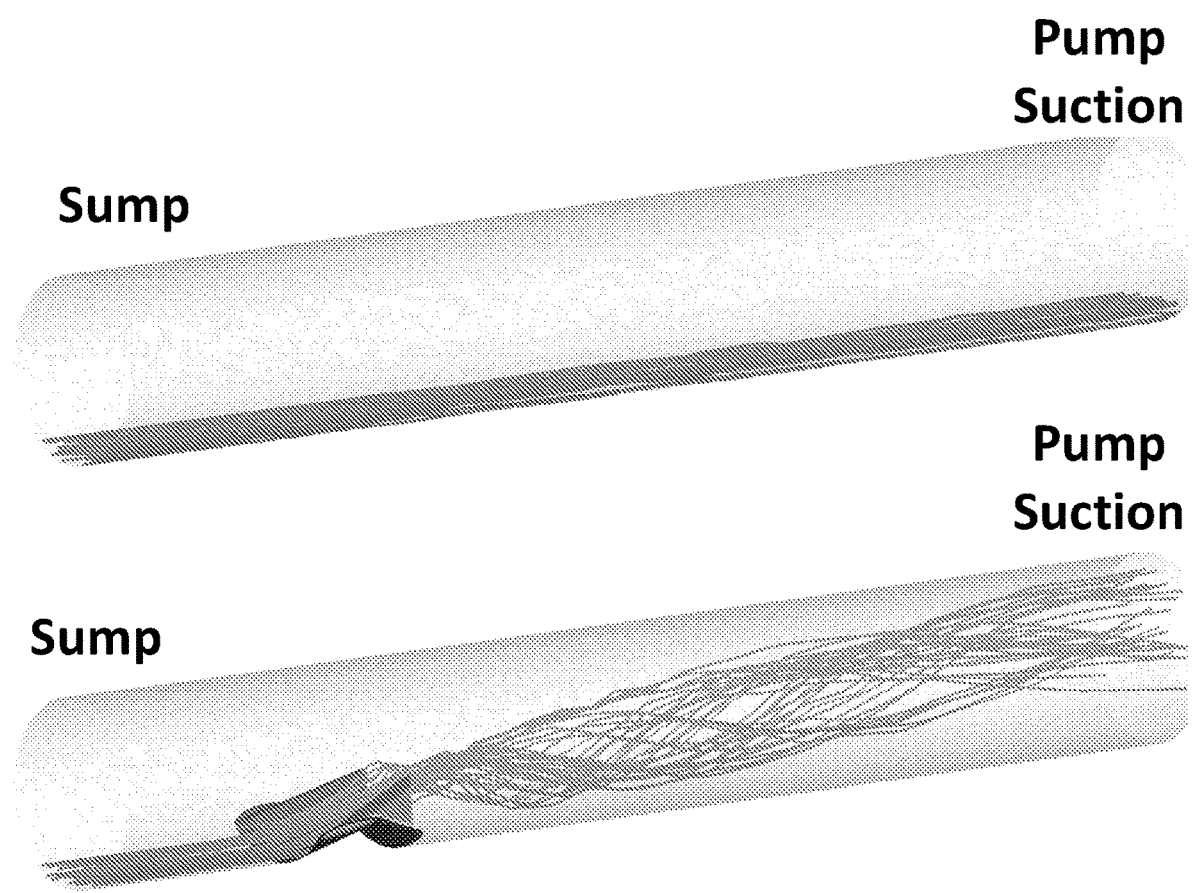
FIGS. 10 and 11 compare traditional pipes (top of each figure) with embodiments of the invention (bottom of each figure). As can be seen, the novel ramp device assists with re-suspending particulates within a moving/sliding bed.
Figure 11:
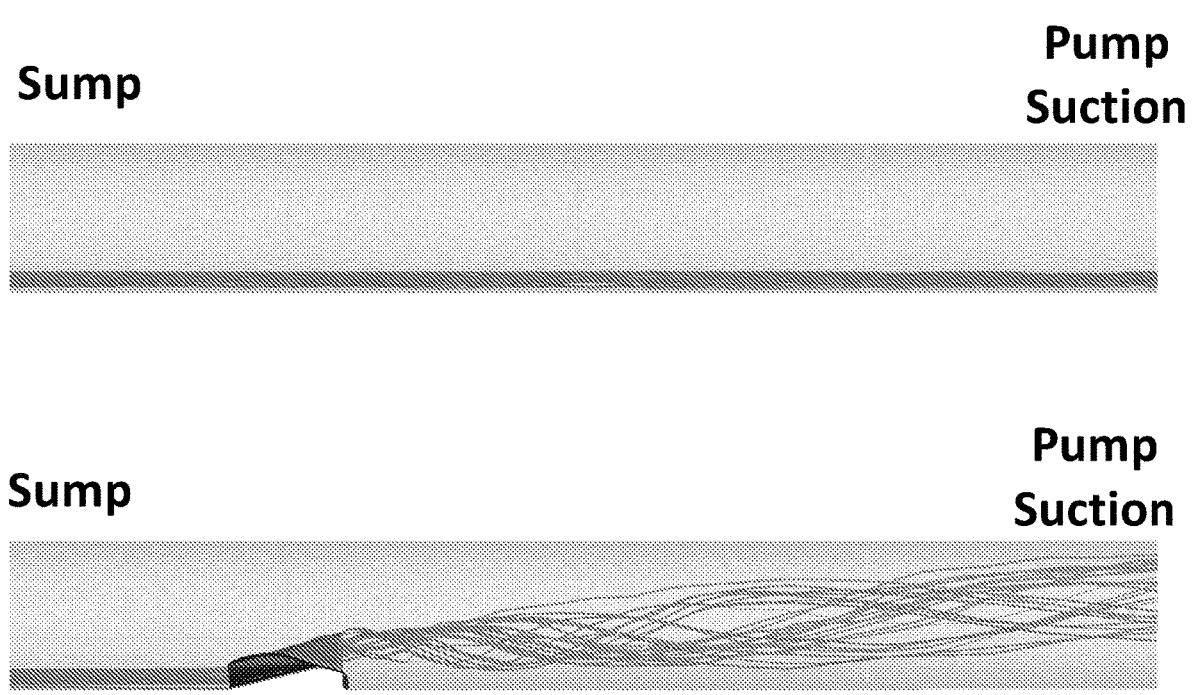
Figure 16:
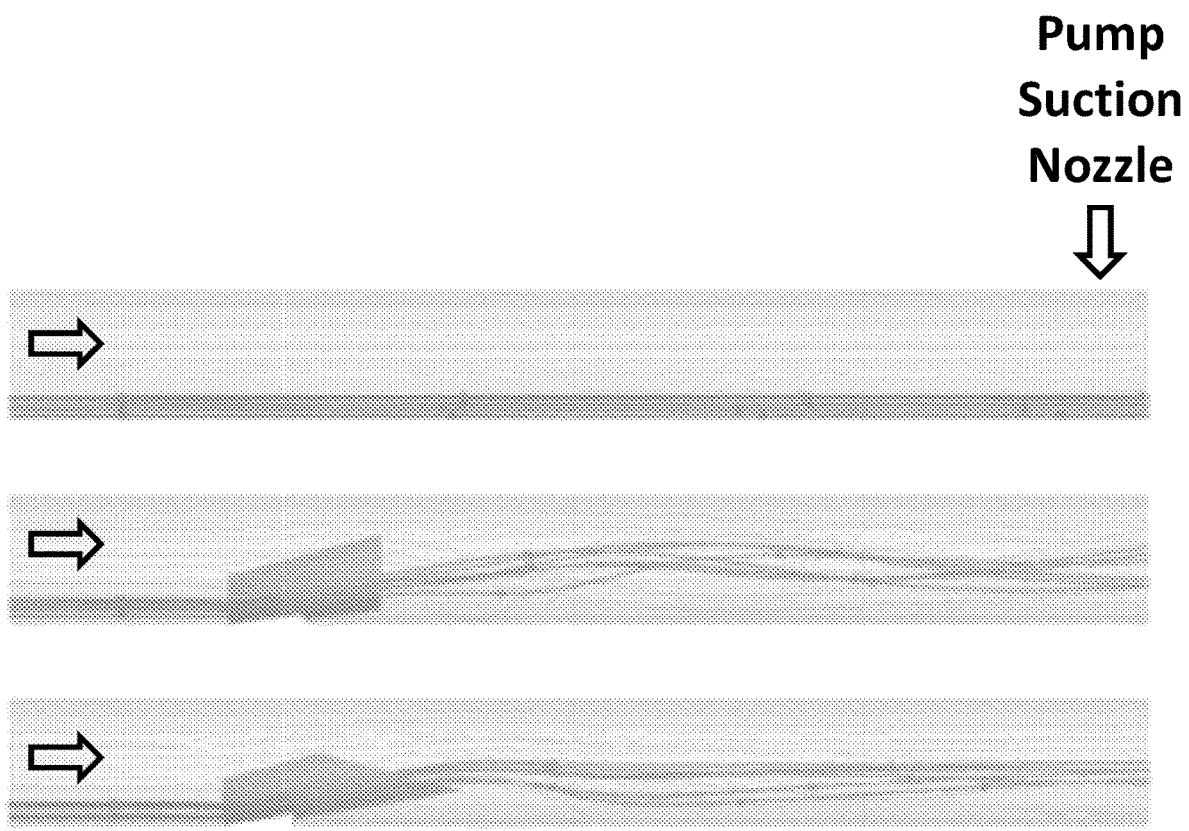
FIGS. 16 and 17 illustrate flow patterns within a conventional suction pipe (top of each figure) as compared with two resuspension closed sub-channel ramp devices according to two possible embodiments disclosed herein (middle & bottom of each figure).
Figure 17:
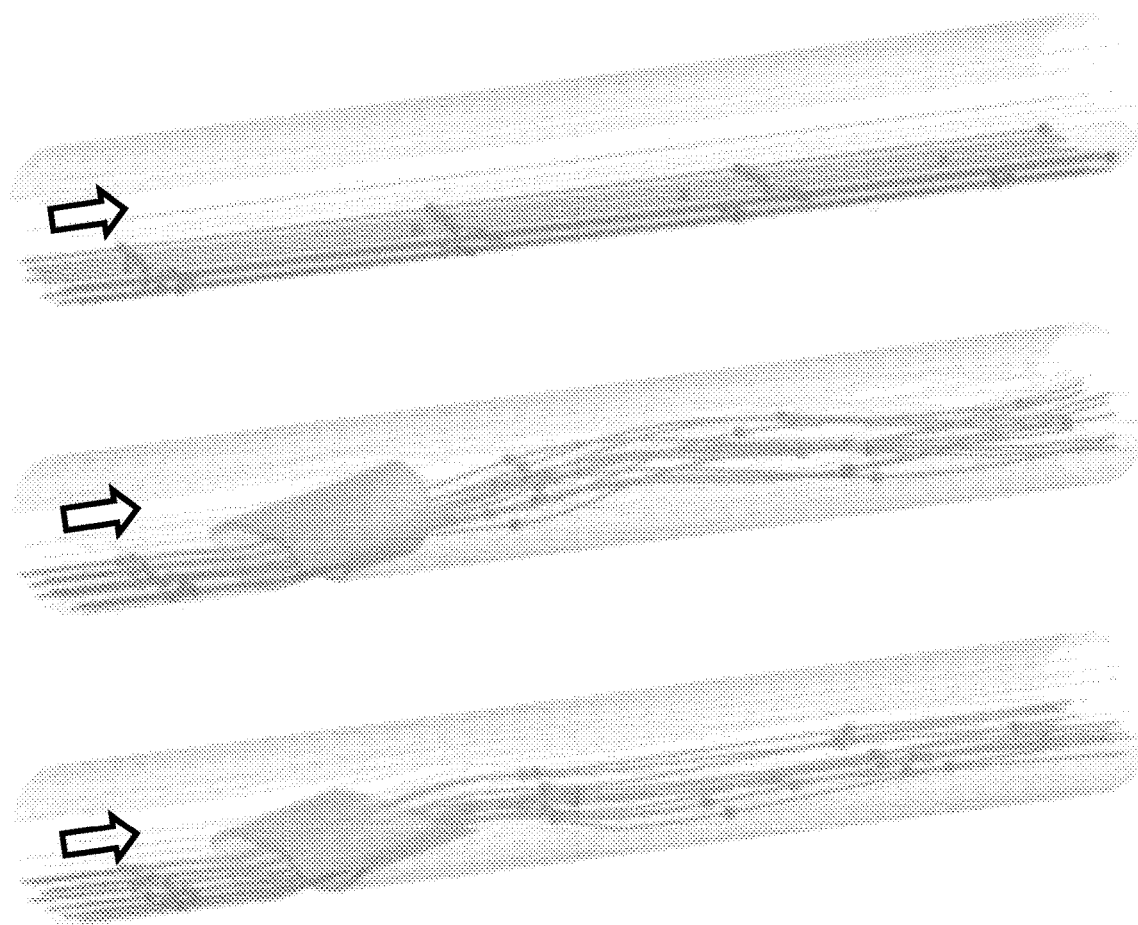
Figure 18:
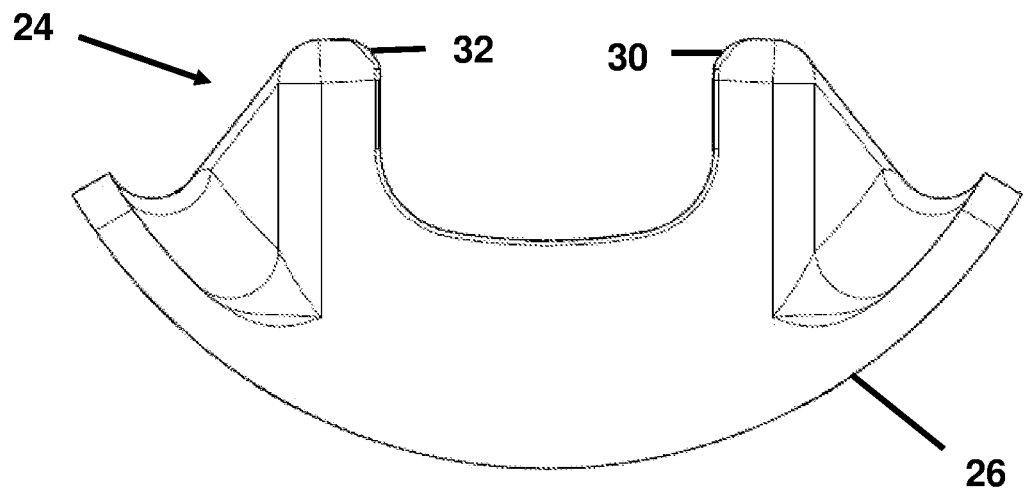
FIG. 18 is a front view of a ramp device of the present invention, according to a different embodiment utilizing wear resistant inserts that can be readily installed within standard slurry pipelines, viewed from the exit direction of slurry when leaving the component.
Figure 19:
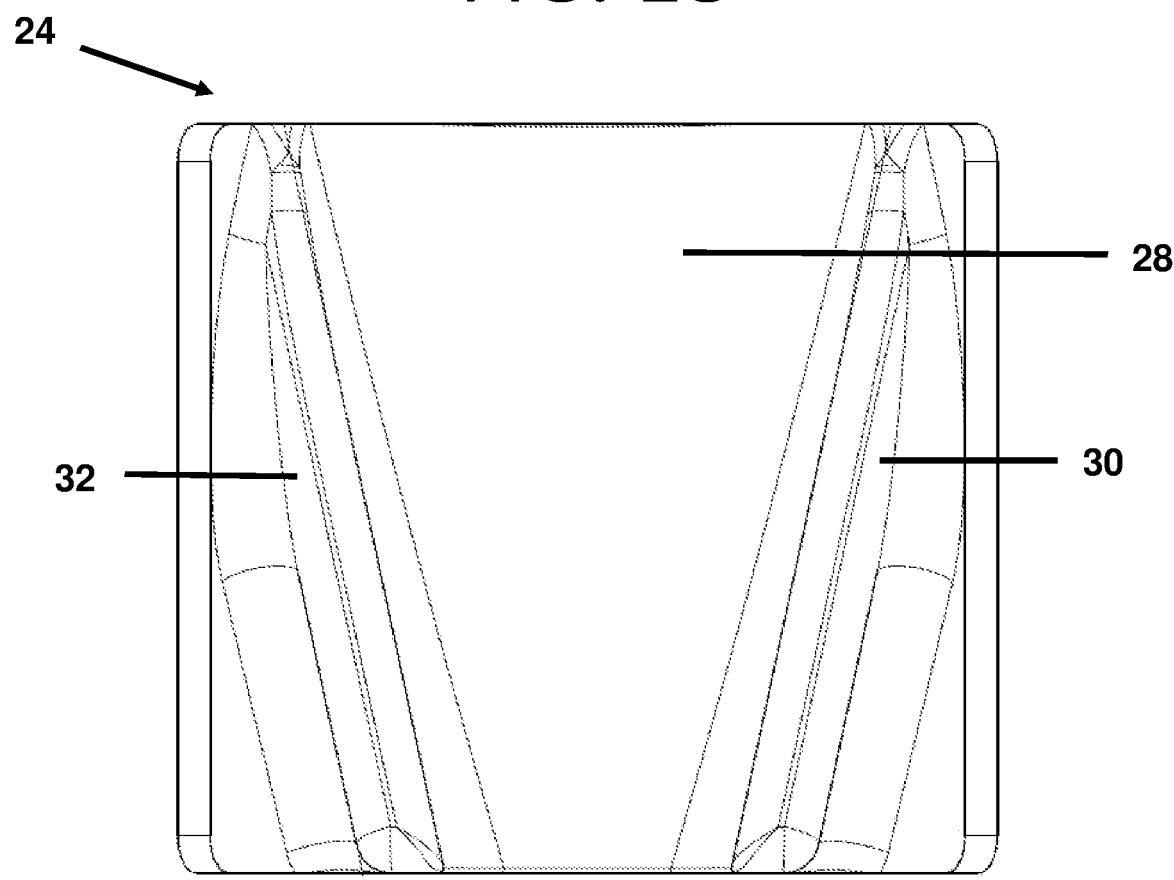
FIG. 19 is a top view of a ramp device of the present invention.

The ramp device may be an open sub-channel adequately configured to pull solids from a moving/sliding bed of particulates located at the bottom of a slurry pipe, lift them, and then discharge them closer to the centerline of the pipe section as suggested in FIG. 9, the bottom of FIGS. 10-11, and the middle & bottom of FIGS. 16-17.

The ramp device may serve to "fluidize" particulates to create a more homogenous flow within a slurry transport pipe or within a component of a slurry transport system, without limitation. Convergent hydraulic design allows slurry above the bed to relocate and/or surround the solids being discharged from the internal sub-channel via the ramp device.

In some preferred embodiments, an internal closed sub-channel may be provided. The internal sub-channel may be configured to bifurcate a pipe section or component of a slurry transport system. By virtue of its design, flow within the pipe section or component of a slurry transport system can be redistributed. As the flow is redistributed via a ramp device, solids are pulled from the moving/sliding bed at the bottom of the pipe section or component of a slurry transport system, thereby lifting them and discharging them closer to the centerline of the pipe. This is all performed whilst the rest of the slurry contained within the pipe section or component of a slurry transport system surrounds the outer walls of this inner sub-channel and reallocate around the solids being discharged from the inner sub-channel.

Where a single element is disclosed in this specification, or illustrated in the appended drawings, it should be understood to mean that one or more of said elements may be provided or substituted in its place. For example, where used herein, the term "ramp device" or "sub-channel" may, according to some embodiments, comprise "at least one" ramp device or "at least one" sub-channel, without limitation. In other words, a number of ramp devices or features thereof may be provided and/or located within a single slurry transport system or component thereof (e.g., pipe section), without limitation. For example, a plurality of ramp devices may be used ubiquitously throughout a slurry transport system, without limitation.

It should also be understood, that any combination of disclosed elements may form a unique embodiment of the invention. For example, a retrofit kit embodiment may be established by combining in any permutation, the necessary structural features to assemble a portion of or a complete ramp device. A retrofit kit embodiment may be established as a slurry transport system component comprising at least one ramp device—which may be provided and/or installed with said slurry transport system. An existing slurry transport system component (e.g., pipe section) may be removed from an existing slurry transport system, and a replacement slurry transport system component comprising at least one ramp device (i.e., a component of the retrofit kit) may be provided in its place.

The disclosure of every patent, patent application, and publication cited, listed, named, or mentioned herein is hereby incorporated by reference in its entirety, for any and all purposes, as if fully set forth herein.

While this subject matter has been disclosed with reference to specific embodiments, it is apparent that other embodiments and variations can be devised by others skilled in the art without departing from the true spirit and scope of the subject matter described herein. The appended claims may include some, but not all of such embodiments and equivalent variations.

The described embodiments are to be considered in all respects only as illustrative and not restrictive. The scope of the invention is, therefore, indicated and governed only by the appended claims, rather than by the foregoing description. All embodiments which come within the meaning and range of equivalency of the claims are to be embraced within their scope.

A contractor or other entity may provide, fabricate, install, maintain, operate, or offer for sale a ramp device or component of a slurry transport system comprising a ramp device as disclosed herein. A contractor or other entity may provide, fabricate, install, maintain, operate, or offer for sale one or more adaptations to an existing slurry transport system or component thereof which might effectively replicate the functionality of the novel ramp device disclosed herein.

A contractor or other entity may provide, fabricate, install, maintain, operate, or offer for sale one or more components or elements of a slurry transport system comprising one or more of the ramp devices or one or more of the structural features which are disclosed herein, without departing from the scope and spirit of the present invention.

Although the invention has been described in terms of particular embodiments and applications, one of ordinary skill in the art, in light of this teaching, can generate additional embodiments and modifications without departing from the spirit of or exceeding the scope of the claimed invention.

Figure 1:
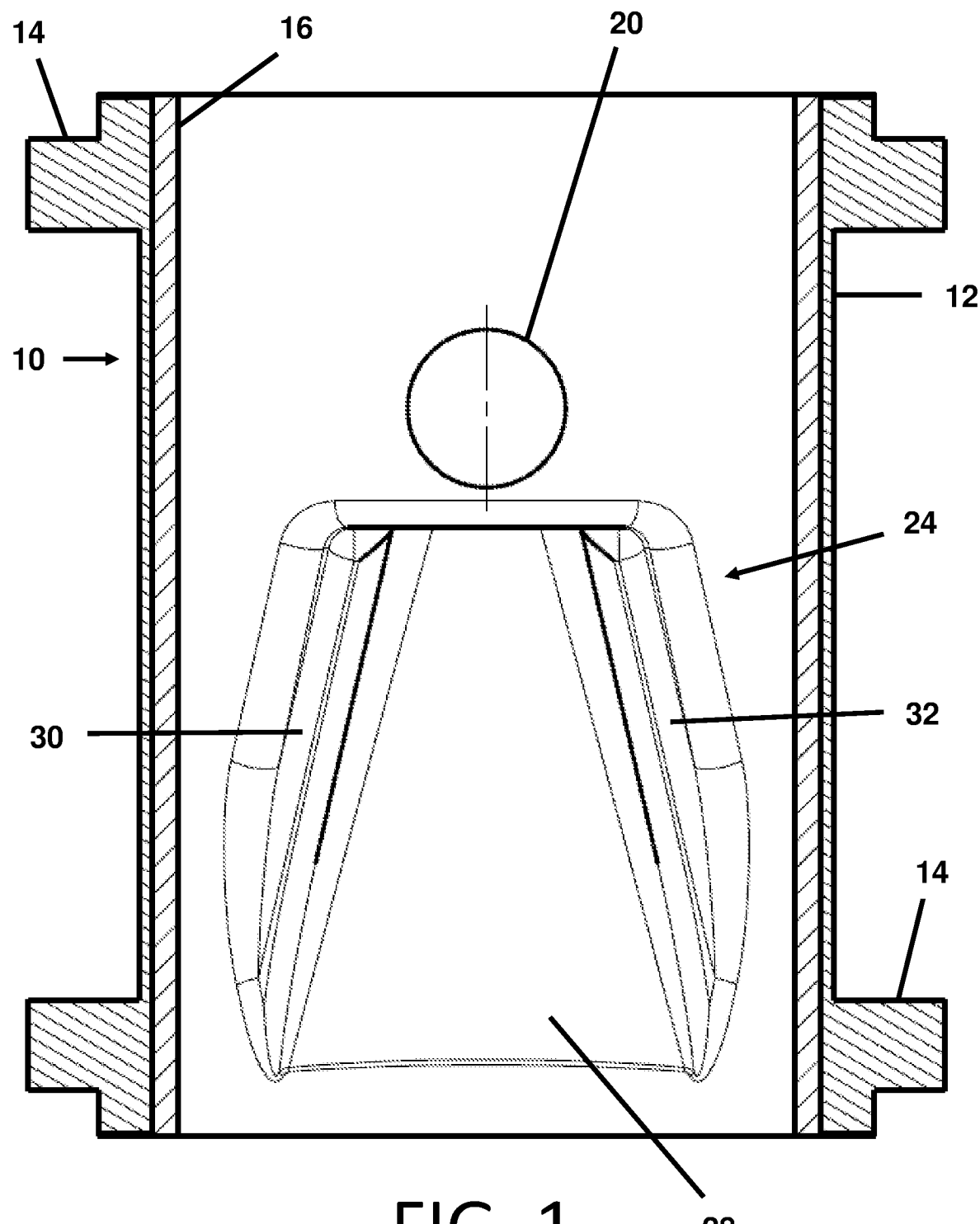
FIGS. 1-5 illustrate a ramp device which may be applied to a component of a slurry transport system according to a first non-limiting embodiment. The ramp device comprises a structure that improves functionality and reduces wear to slurry transport system components and their substrates.
Figure 2:
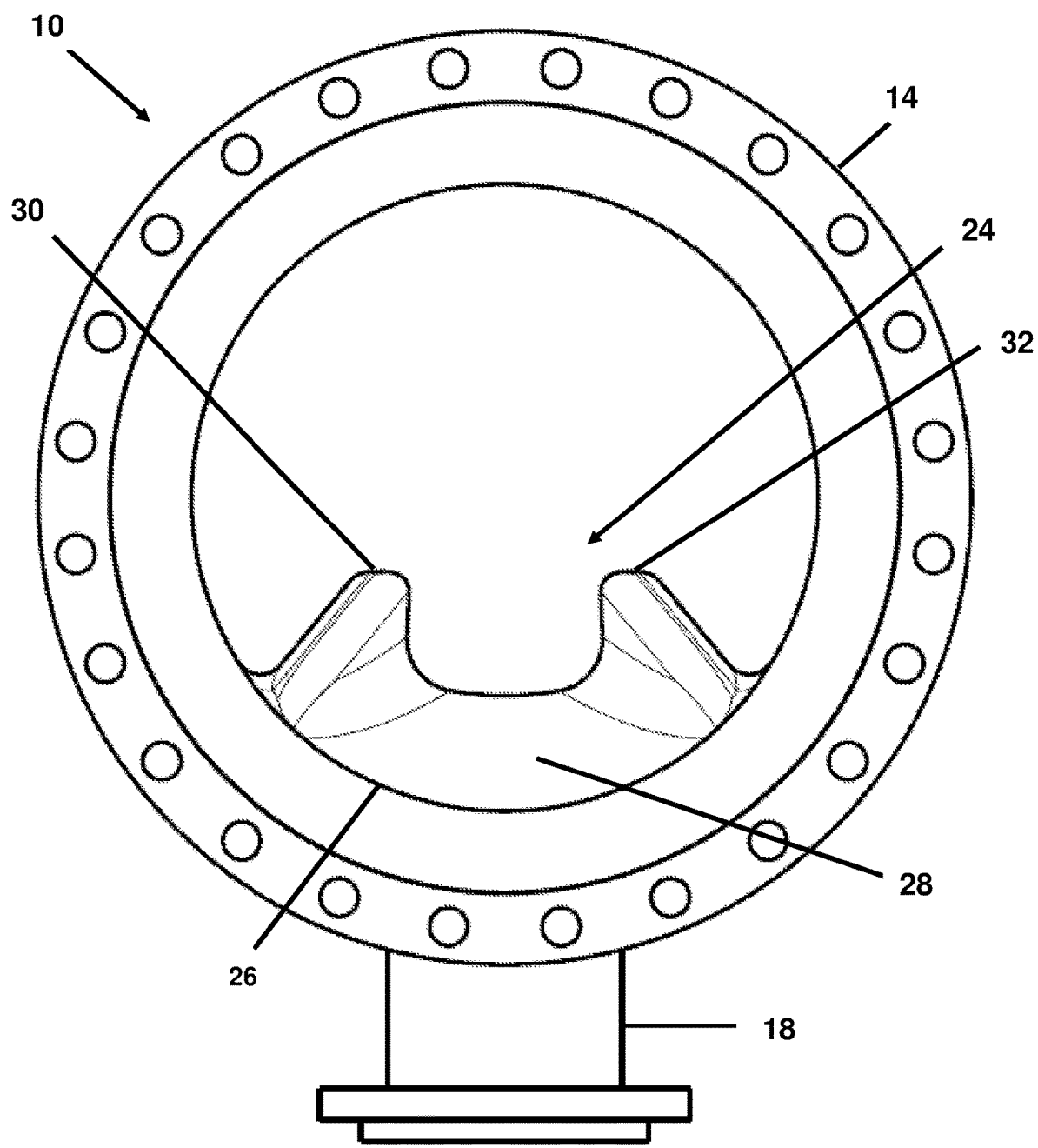
Figure 3:
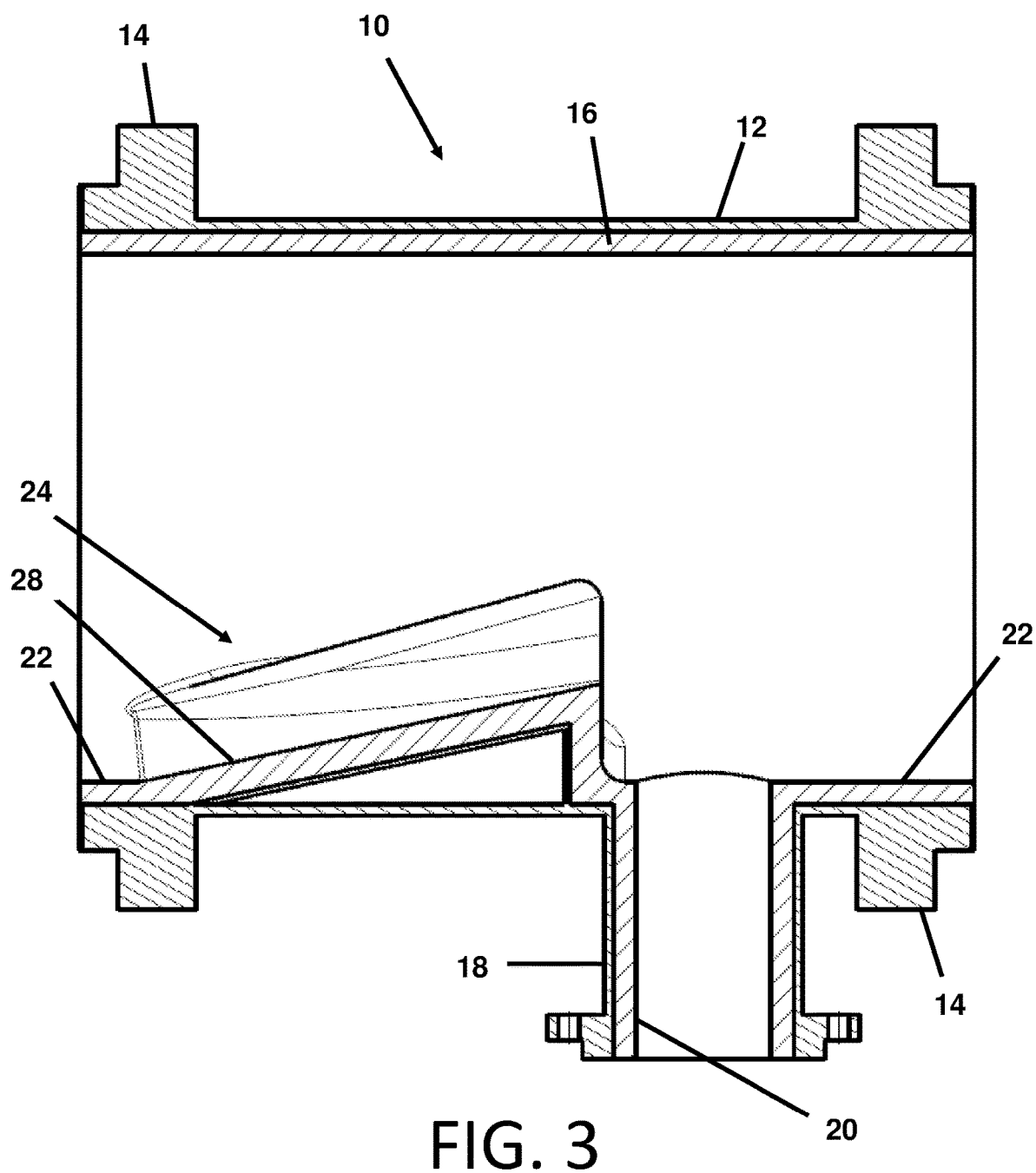
Figure 4:
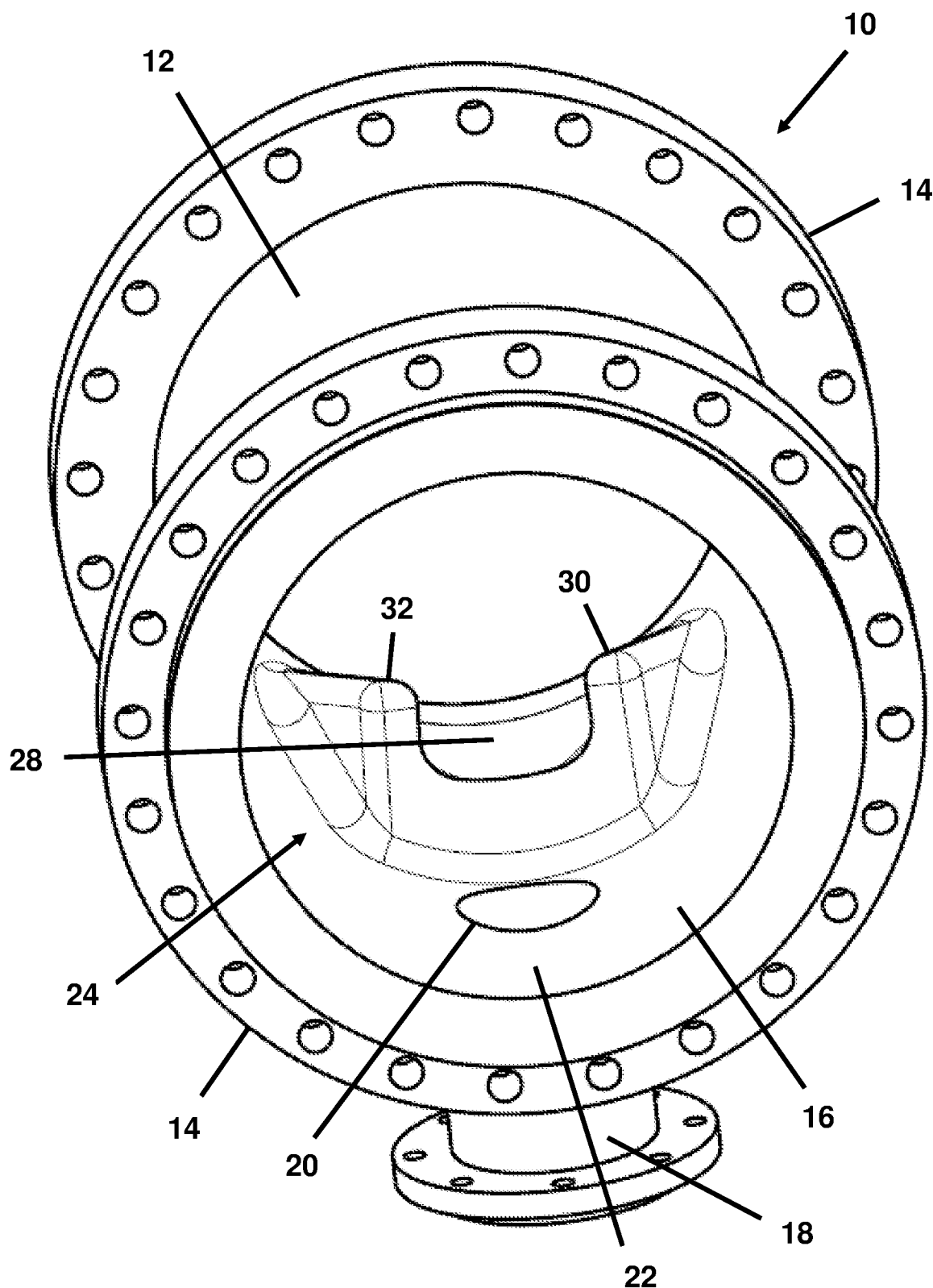
Figure 5:
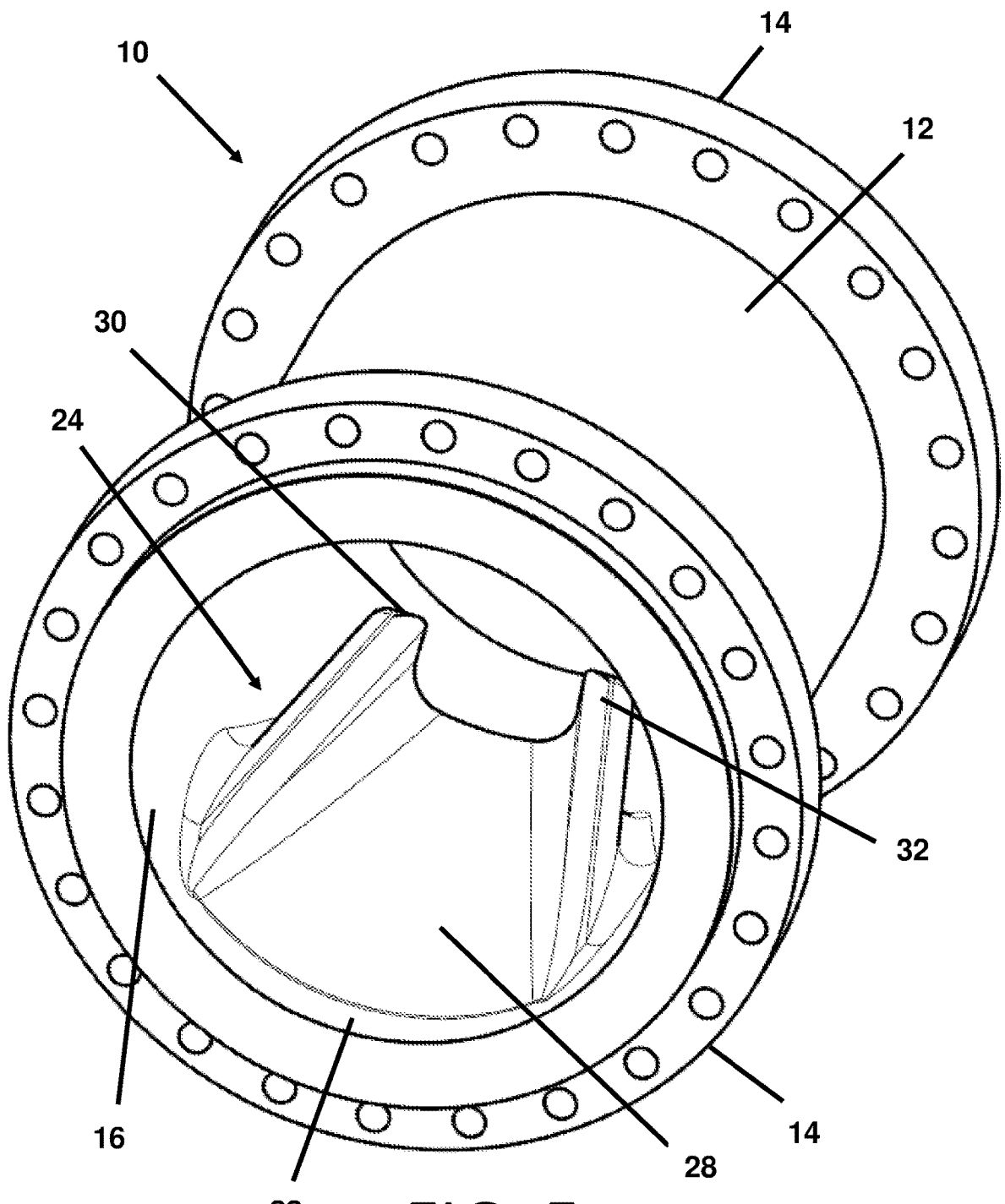
Figure 6:
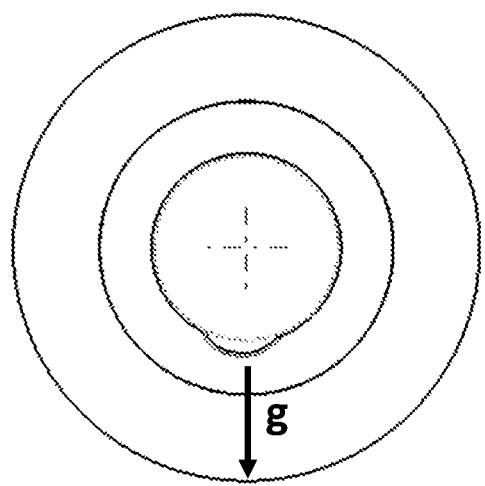
FIGS. 6-7 illustrate problems associated with prior art—in particular, areas of localized severe wear to suction side slurry pump components at the inner diameter around the 6 o'clock position.
Figure 7:
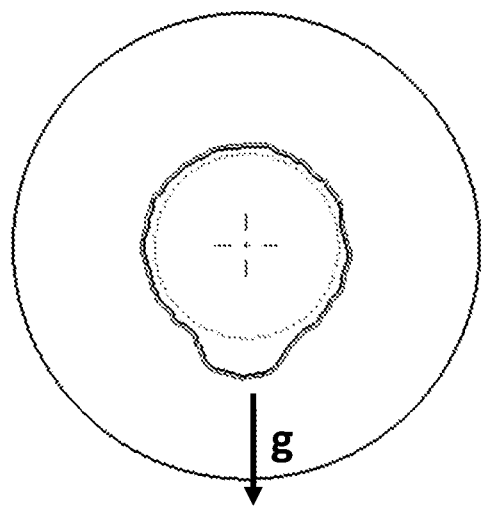

FIGS. 6 and 7 illustrate the problems associated with wear created by abrasive slurry flows within pumps utilized in slurry transport systems. As an example, these figures show areas of localized severe wear on the suction side of slurry pump components at the inner diameter around the lower region, or 6 o'clock position, of the interior surfaces. FIG. 6 shows wear around the bottom of the inner diameter of an FLSmidth® KREBS adjustable wear ring, while FIG. 7 shows wear around the bottom of the inner diameter of a throat bush or suction liner in a conventional slurry pump. Since this type of wear reduces significantly the useable service life of these components, reducing such wear is desirable.

Figure 8:
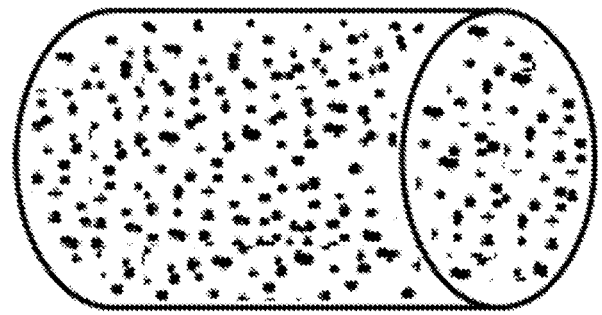
FIG. 8 depicts various flow regimes possible within a slurry transport system (e.g., within a pipe or pipeline component). This figure further represents the usual depiction of liquid-solid pipe flow under different regimes, and illustrates how concentration may increase at the bottom of a pipeline as settling increases. Moving/sliding beds of coarse abrasive particles gravitating to bottom areas (due to gravity) may cause wear to slurry pipelines and pump components at the 6 o'clock position.
Figure 8:
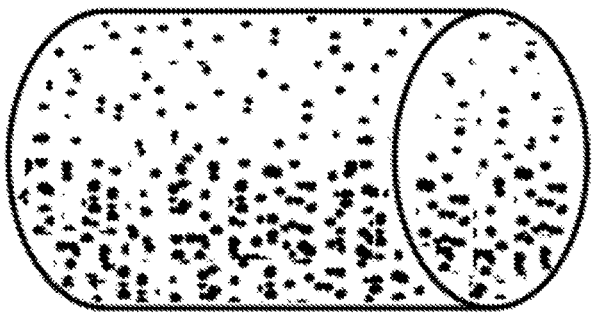
Figure 8:
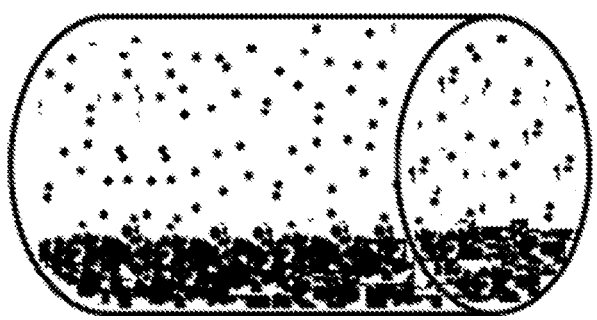

FIG. 8 depicts various flow regimes possible within a slurry transport system (e.g., within a pipe or pipeline component). Homogeneous flow typically involves solid particles suspended generally uniformly throughout the slurry. Heterogeneous flow, full particle suspension typically involves solid particles suspended non-uniformly throughout the slurry, with more solid particles disposed within the lower portion of the slurry due to gravity. Heterogeneous flow, sliding bed typically involves solid particles disposed with considerably higher concentration within the lower portion of the pipeline such that travel of the lower portion is significantly hindered displaying lower velocity or even completely stopped. Accordingly, this figure represents the usual depiction of liquid-solid pipe flow under different regimes, and illustrates how concentration may increase at the bottom of a pipeline as settling increases. Moving/sliding beds of coarse abrasive particles concentrated at the bottom area due to gravity may cause severe local wear to slurry pump components around the lower, or 6 o'clock, position. As a result, the present invention aims to redirect the sliding bed solids away from the lower, or 6 o'clock, region of a slurry transport system, redistributing the solid particles into other regions of the pipeline to improve flow uniformity, preventing or reducing the severe local wear at the lower region of pump internal surfaces associated with the sliding bed regime.

In accordance with the present invention, FIGS. 1 through 5, and FIGS. 13 through 15, and FIGS. 18 through 22 show a component of a slurry transport system, generally at 10, which may be in the form of a slurry transport pipe, pipeline, pipe spool, pump suction entrance, or sump entrance section, including feed, inlet, discharge, tap, drain, suction and/or injection sections of any of the above. In this illustration, the component 10 is shown in the form of a suction spool of the type used for slurry transport. The component 10 is shown to be of substantially cylindrical nature, although it may be of any suitable shape for slurry transport. The component 10 is shown to comprise an exterior frame 12 and a plurality of mounting flanges 14 for securing the component 10 in any suitable location within a slurry transport system. Accordingly, the exterior frame may be constructed of any suitable material for slurry transport including various typical metal materials such as steel and irons, or polymer pipes and tubing, or a wear resistant metal such as steel or chrome white iron if needed. The component 10 also includes an interior liner 16, which may be either of unitary construction with the exterior frame 12 or of a separate construction that is inserted within the exterior frame 12 or otherwise formed or constructed to form the interior surface of the component 10. Accordingly, the interior liner 16 may be constructed of the same metal as the exterior frame 12 or of an alternate material, such as rubber, polyurethane, a plastic, polymeric, elastomeric, or a metal such as chrome white iron, or corrosion resistant alloys when needed, or wear resistant ceramic coatings, or other suitable wear-resistant material.

In this arrangement, the component 10 includes a drain port 18 attached to the exterior frame 12 and including an interior aperture 20 disposed in fluid communication with the interior of the component 10, extending from the interior liner 16 and through the exterior frame 12. The suction port 18 is generally constructed with the component 10, and as such, is generally of the same material as the exterior frame 12, although it can also be an attachment to the component 10 made of other suitable material. The drain port 18 is disposed along the bottom, downward, or "6 o'clock position" portion of the component 10, designated at 22, although the present invention is also suitable for use without such a drain port 18, or where a suction port 18 is disposed differently from the configuration shown.

The component 10 is also shown to include a ramp device, generally at 24, disposed upon the bottom, downward, or 6 o'clock position 22, of the interior liner 16. The ramp device may be made from the same or a different material as the exterior frame 12 and/or the interior liner 16, including various metals such as chrome white iron, wear or corrosion resistant metal alloys, or polymers such as rubber, polyurethane, or wear resistant ceramics, or any other suitable wear resistant materials. Accordingly, the ramp device 24 may be formed integrally with the interior liner 16 or with the interior liner 16 and the exterior frame 12 together, or it may also be a separate insert or attachment fixedly disposed by any suitable means including fasteners, adhesive, slots, notches, wedges or other suitable engagement devices or means upon the interior liner 16 at the bottom, downward, or 6 o'clock position 22.

The ramp device 24 is constructed in a shape suitable for remaining affixed in a stationary position upon the interior liner 16, while at the same time being constructed in an open channel shape operable for directing slurry flow, and coarser particles often located at the bottom portion of slurry pipe flow, traveling through the component 10 in an upward direction away from the bottom, downward, or 6 o'clock position 22 of the interior liner 16. Alternatively, it will be appreciated that the ramp device 24 may instead be of a closed channel configuration as shown in FIGS. 16 and 17. In an open channel configuration, the ramp device 24 includes a curved base 26 that is generally of the same curvature as the portion of the interior liner 16 upon which it is mounted, or formed in a unitary manner with. The ramp device 24 is formed in such a shape to include an upwardly sloped or inclined central section, or ramp, 28, that is concave in its surface configuration and tapered in its width from front to rear for directing slurry flow upwardly, or upwardly and inwardly, as may be desired (such as toward a longitudinal centerline of the component 10) during its travel over the ramp device 24, so as to alter the flow of particulates (e.g., suspend or re-suspend coarse abrasive particles) and reduce wear on the bottom, downward, or 6 o'clock position 22 of the slurry pump components. Alternatively, it will be appreciated that the upwardly sloped central section, or ramp, 28, may be substantially flat instead of concave, and may not be tapered in its width, but is preferably designed in a configuration beneficial for directing slurry flow towards the pipeline centerline upwardly, or upwardly and inwardly during its travel over the ramp device 24.

The upwardly sloped central section, or ramp, 28, is surrounded on both sides by first and second guide sections 30 and 32 that protrude upwardly, and may also be substantially vertically, from each side of the upwardly sloped central section, or ramp, 28. The first and second guide sections 30 and 32 are also shown to be tapered inwardly toward the vertical center plane of the component 10 for providing inward directivity to the slurry flow. However, the degree and direction of tapering for first and second guide sections 30 and 32 may also be altered (inwardly toward the vertical center plane of the component 10, substantially parallel to each other or outwardly toward the interior liner) to achieve the desired slurry flow. It will also be appreciated that the sizes of the first and second guide sections 30 and 32 may also be changed to achieve the desired degree and direction of slurry flow change. Together with the upwardly sloped central section, or ramp, 28, the first and second guide sections 30 and 32 are also operable for directing slurry flow to a desired upward, or upward and inward, or upward and outward direction during its travel over the ramp device 24, to alter the flow of particulates (e.g., suspend or re-suspend coarse abrasive particles) and reduce wear on the bottom, downward, or 6 o'clock position 22 of the interior liner 16.

Figure 20:
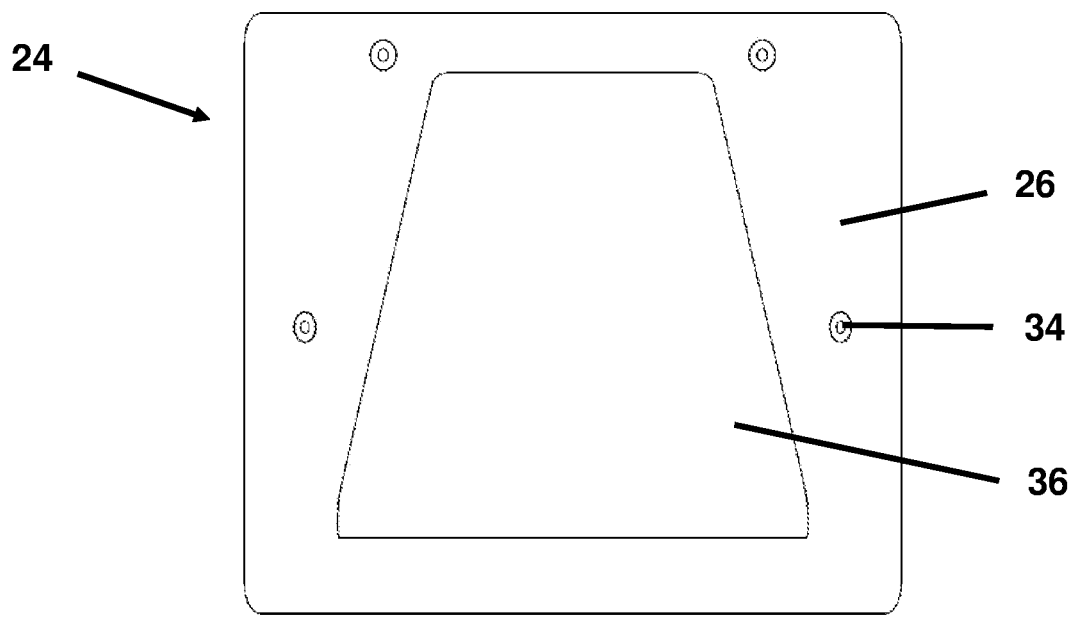
FIG. 20 is a bottom view of a ramp device of the present invention.
Figure 21:
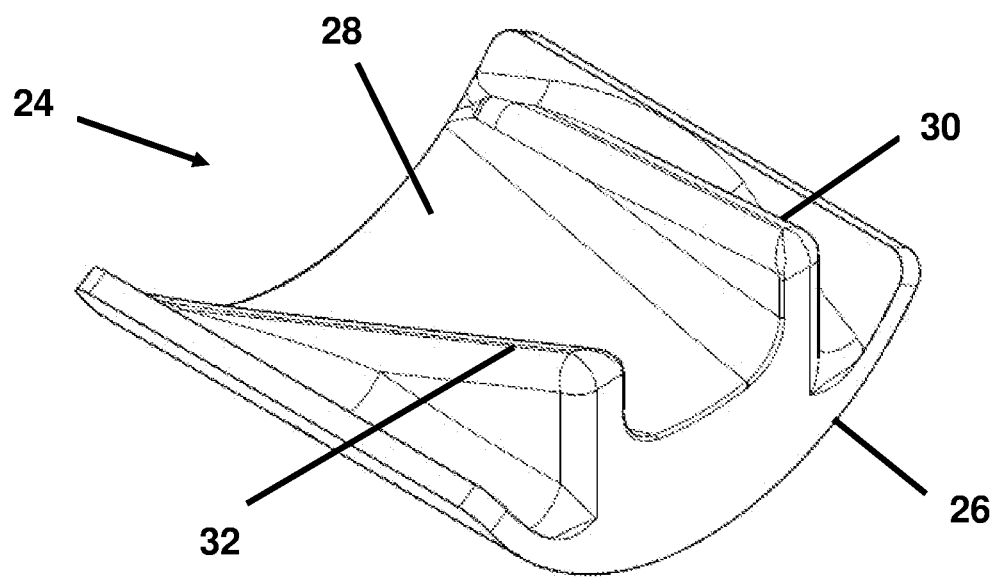
FIG. 21 is an isometric view showing the top portion of a ramp device of the present invention.
Figure 22:
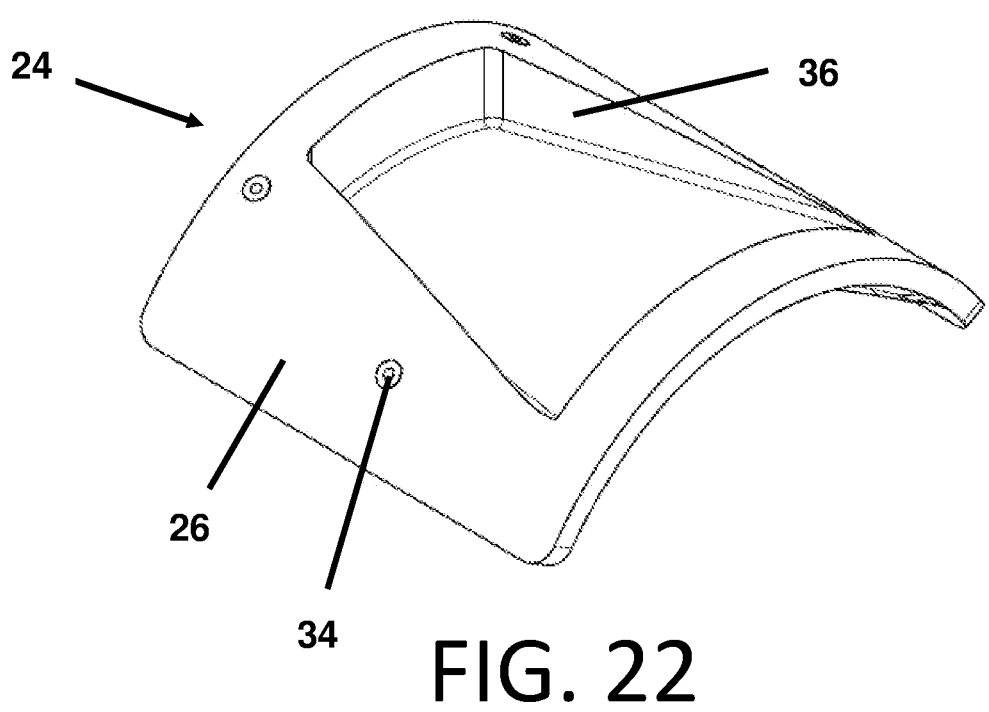
FIG. 22 is an isometric view showing the bottom portion of a ramp device of the present invention.

FIGS. 20 and 22 show the configuration of the lower surface of the ramp device 24, which includes one or more apertures 34 through which one or more suitable fasteners (not shown) may be inserted for securing the ramp device 24 to the interior liner 16 of the component 10. Alternatively, other fastening means, such as adhesive, slots, notches, wedges or other suitable engagement devices or means may also be used. As also seen in FIGS. 20 and 22, the lower surface of the ramp device 24 includes a recess 36 formed in part by the configurations of the ramp 28 and first and second guide sections 30 and 32 on the reverse, or upper, side of the ramp device 24.

Figure 13:
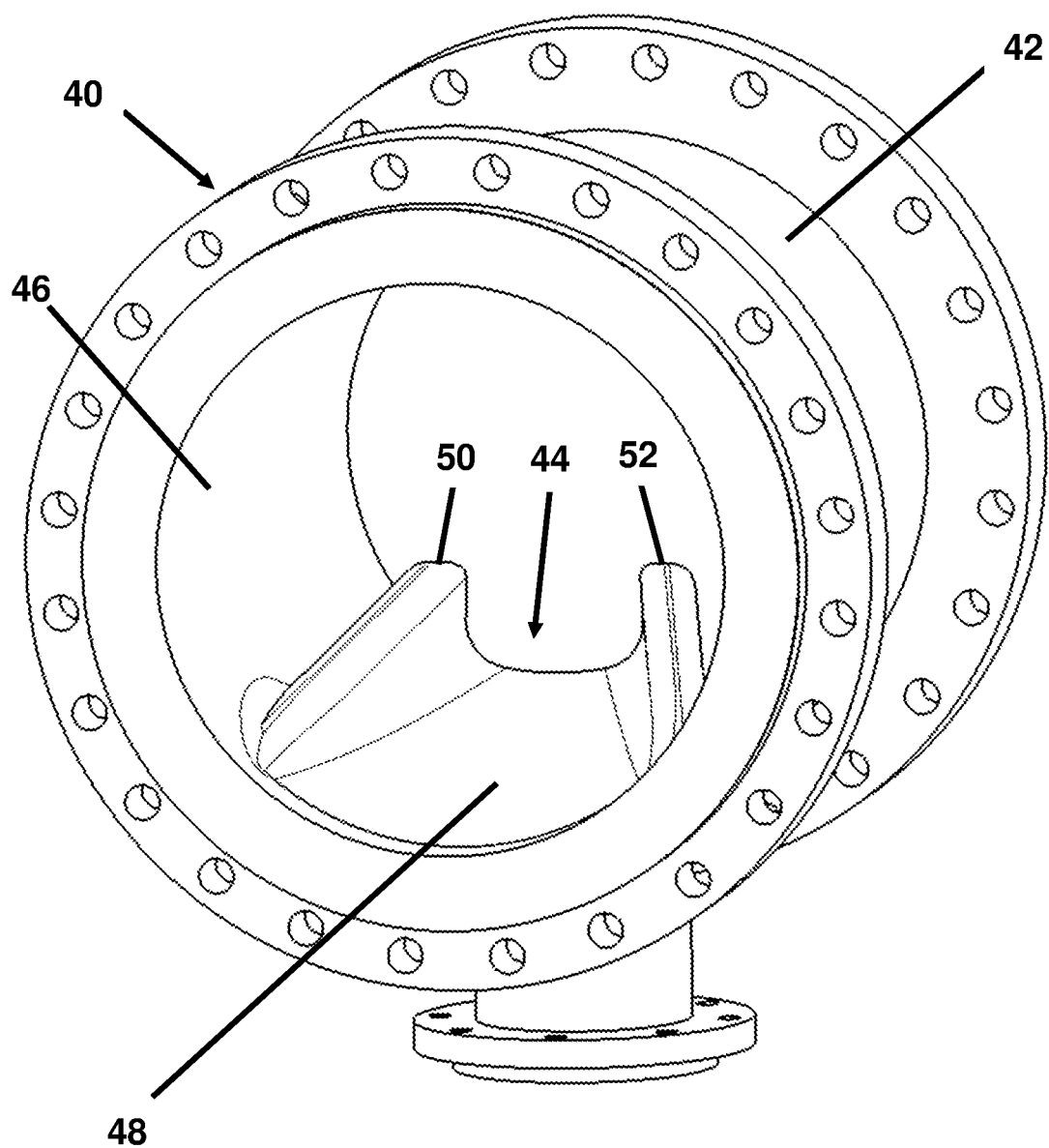
FIGS. 13-15 are isometric views of a component of a slurry transport system comprising a ramp device according to some embodiments.
Figure 14:
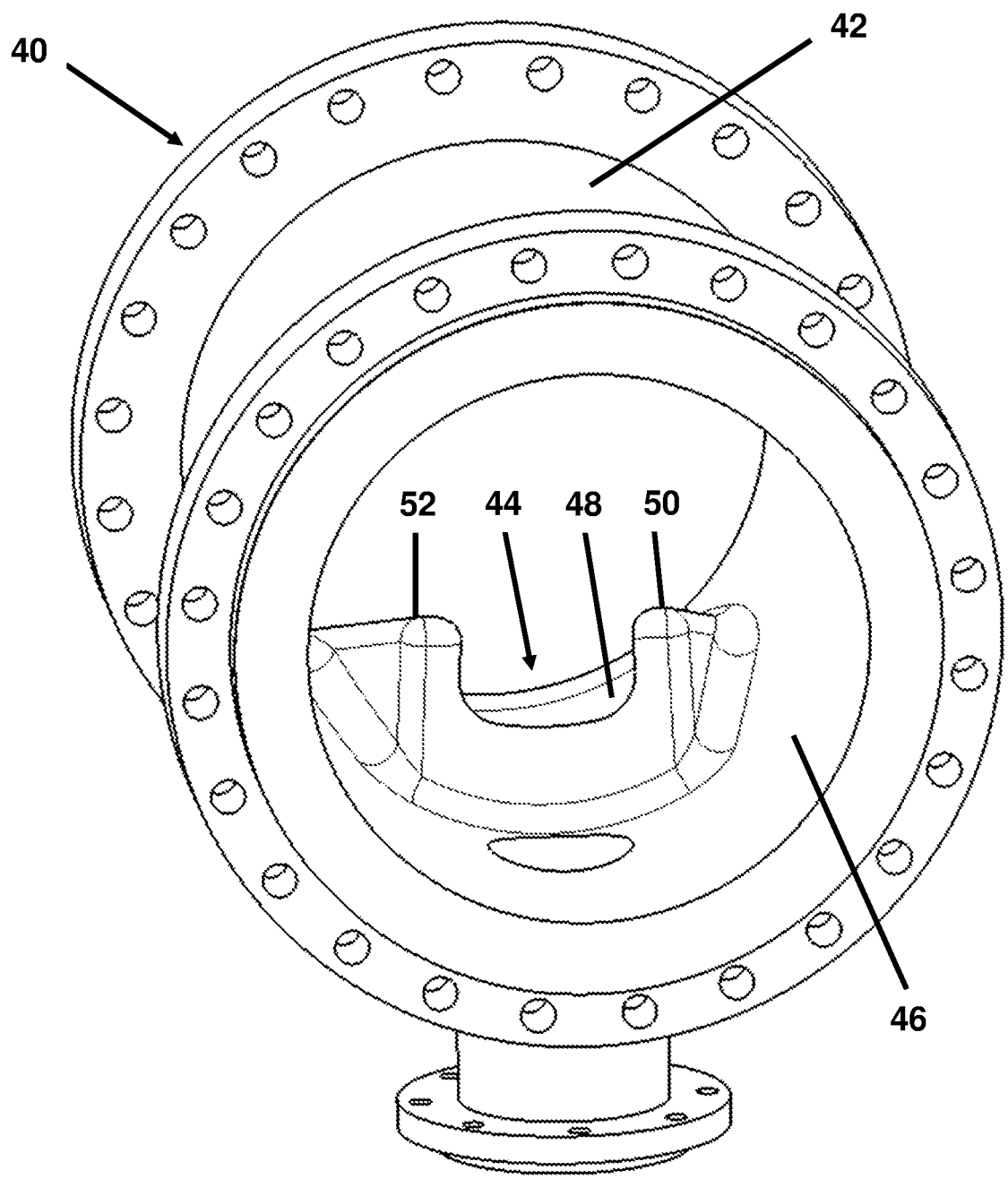
Figure 15:
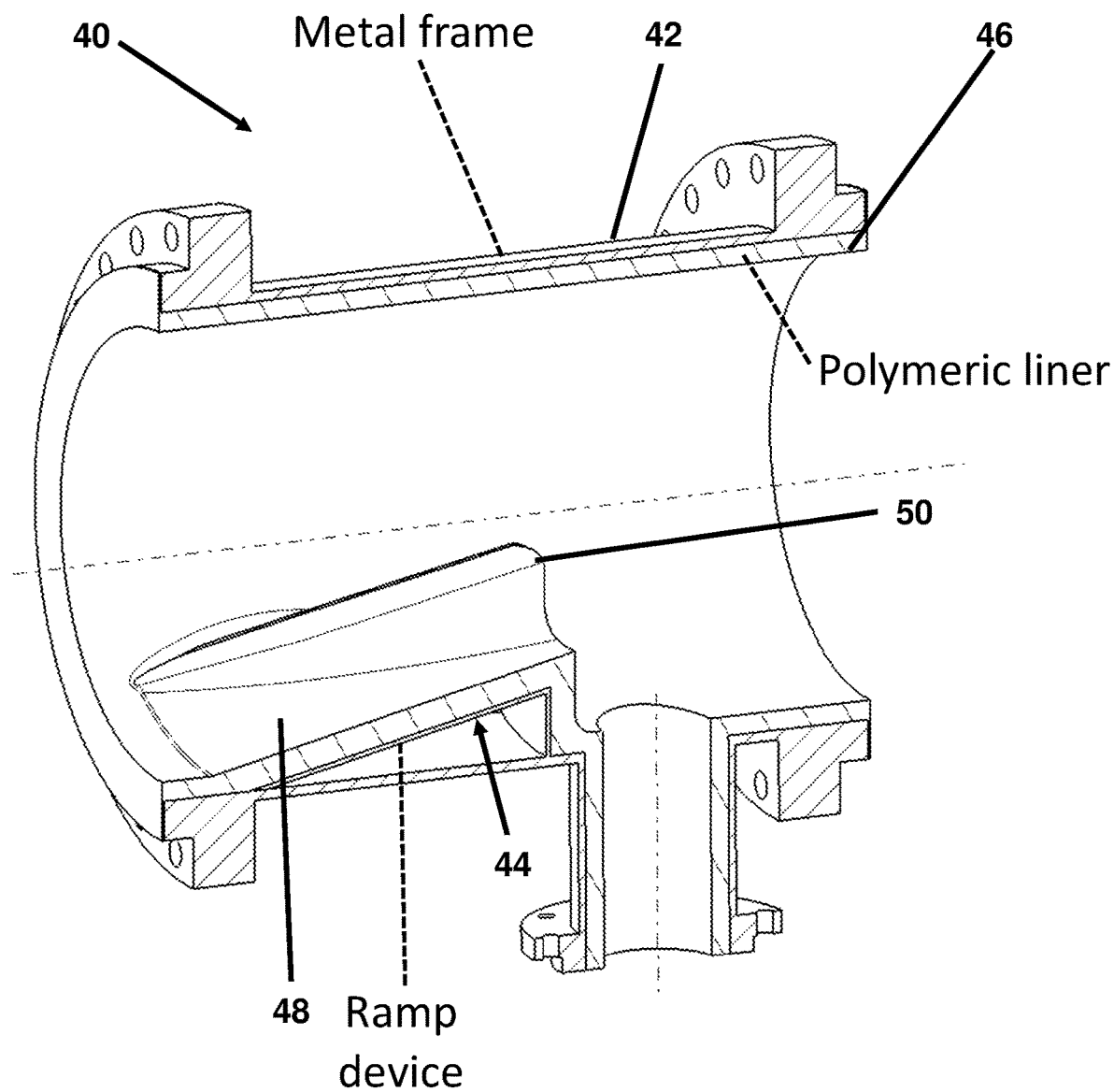

Referring now to FIGS. 13 through 15, there is shown an alternate embodiment of the invention wherein a component of a slurry transport system 40 is again constructed of any suitable material for accommodating slurry transport including various metal materials such as steel, a wear resistant iron, or any suitable metal alloys or polymer. The component 40 may again be in the form of a slurry transport pipe, pipeline, pipe spool, pump suction entrance, or sump entrance section, including feed, inlet, discharge, tap, drain, suction and/or injection sections of any of the above. Again, in this arrangement, the component 40 is shown in the form of a suction pipe spool of the type used for slurry transport. The component 40 again includes an exterior frame 42 of similar construction as before. In this arrangement, however, a ramp device 44 is formed in a unitary manner together with an interior liner 46, of suitable polymeric material such as rubber or polyurethane, or a wear resistant metal such as chrome white iron, or a corrosion resistant steel or metal alloy, or wear resistant ceramic liner, [correct?] or other suitable wear-resistant material. Again, the ramp device 44 includes an upwardly sloped central section, or ramp, 48, that is surrounded on both sides by first and second guide sections 50 and 52 that protrude upwardly, and may also be substantially vertically, from each side of the upwardly sloped central section, or ramp, 48. It will be appreciated that the various configuration arrangements for the upwardly sloped central section, or ramp, 48, and the first and second guide sections 50 and 52 are again available in this arrangement as may be desired for directing slurry flow in the desired way as before.

Figure 12:
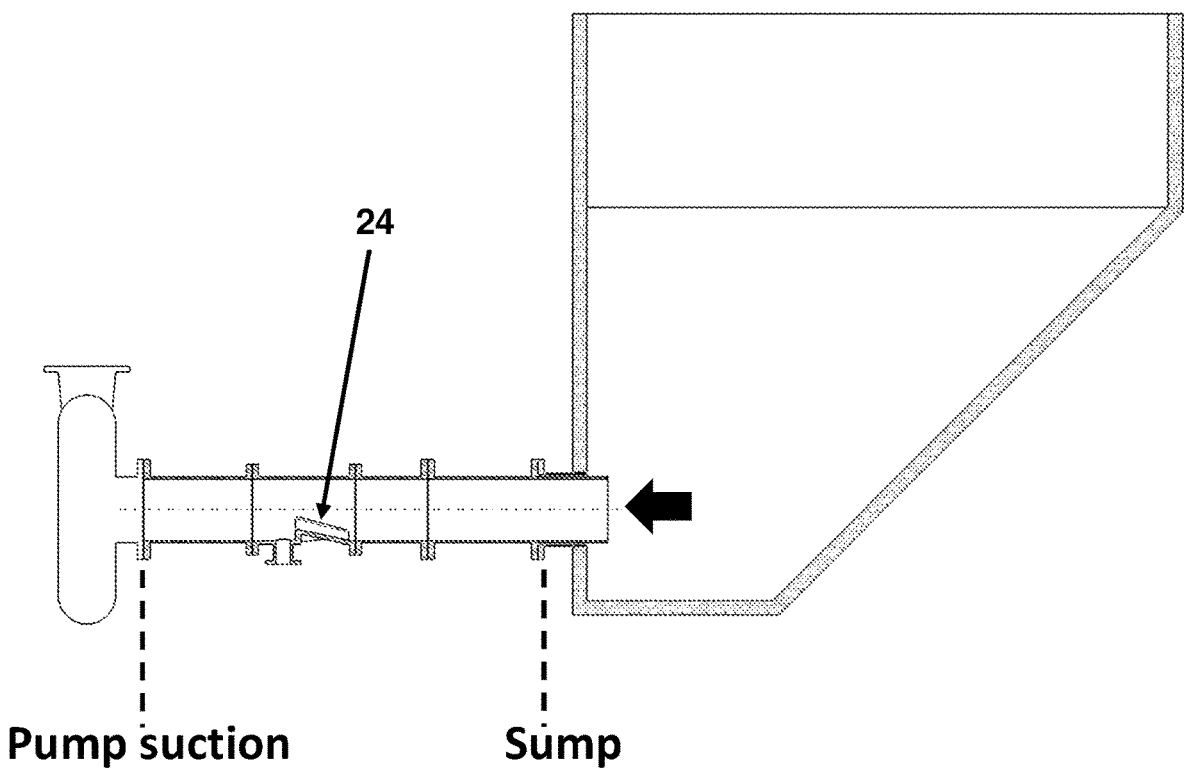
FIG. 12 depicts possible useful locations for a ramp device according to embodiments of the invention, particularly within a short distance and upstream from a pump suction nozzle.

FIGS. 9 through 12, 16 and 17 illustrate numerical predictions of slurry flow trajectories (showing liquid and solid flows) in various flow and suction scenarios, including how a ramp device of the present invention can desirably alter slurry flow resuspending the solids settled away from the bottom to promote a more uniform flow concentration at the suction of the slurry pump. Specifically, FIG. 12 illustrates one possible location for a component including a ramp device of the present invention within a slurry transport system.

In the method of the present invention, lower interior surface wear in a slurry transport system can be desirably reduced by providing one or more ramp devices of the type disclosed herein that are operable for directing slurry flow in an upward direction away from a lower interior surface of the slurry transport system. Such ramp devices are disposed upon one or more locations along the lower interior surface of said slurry transport system (either by being affixed to such lower surfaces or by being integrally formed as part of such lower surfaces) and transporting slurry through the slurry transport system across the installed ramp devices.

While this subject matter has been disclosed with reference to specific embodiments, it is apparent that other embodiments and variations can be devised by others skilled in the art without departing from the true spirit and scope of the subject matter described herein. The appended claims include all such embodiments and equivalent variations.

The invention claimed is:

1. A component of a slurry transport system operable for directing slurry flow in an upward direction away from a lower interior surface of said component, comprising:
   an exterior frame;
   an interior liner disposed within an interior of said exterior frame, said interior liner operable for accommodating travel of a slurry flow therethrough; and
   a ramp device disposed upon a lower surface of said interior liner, said ramp device operable for directing slurry flow within said interior liner in an upward direction away from said lower surface of said interior liner, for re-suspending coarse solid particulates away from a lower portion of said slurry flow, thereby reducing wear associated with said coarse particulates upon slurry pumps located downstream from said component, wherein said ramp device is affixed to said lower surface of said interior liner by suitable fastening means.

2. The component according to claim 1, wherein said ramp device is operable for directing slurry flow within said interior liner in an upward and inward direction away from said lower surface of said interior liner.

3. The component according to claim 1, wherein said interior liner is constructed of a material selected from the group consisting of metal, metal alloy, chrome white iron, steel, ceramics, rubber, polyurethane, plastic, elastomeric and polymeric materials.

4. The component according to claim 1, wherein said ramp device is constructed of a material selected from the group consisting of metal, metal alloy, chrome white iron, steel, ceramics, rubber, polyurethane, steel, plastic, elastomeric and polymeric materials.

5. The component according to claim 1, wherein said ramp device comprises an upwardly inclined section operable for directing slurry flow in an upward direction away from said lower surface of said interior liner.

6. The component according to claim 1, wherein said ramp device comprises an upwardly inclined and concave section operable for directing slurry flow in an upward direction away from said lower surface of said interior liner.

7. The component according to claim 1, wherein said ramp device comprises:
   a base having a general curvature substantially matching a curvature of a portion of said interior liner upon which it is disposed; and
   an upwardly inclined section operable for directing slurry flow in an upward direction away from said lower surface of said interior liner.

8. The component according to claim 1, wherein said ramp device comprises:
   a base having a general curvature substantially matching a curvature of a portion of said interior liner upon which it is disposed; and
   an upwardly inclined and concave section operable for directing slurry flow in an upward direction away from said lower surface of said interior liner.

9. A component of a slurry transport system operable for directing slurry flow in an upward direction away from a lower interior surface of said component, comprising:
   an exterior frame;
   an interior liner disposed within an interior of said exterior frame, said interior liner operable for accommodating travel of a slurry flow therethrough; and
   a ramp device disposed upon a lower surface of said interior liner, said ramp device operable for directing slurry flow within said interior liner in an upward direction away from said lower surface of said interior liner, for re-suspending coarse solid particulates away from a lower portion of said slurry flow, thereby reducing wear associated with said coarse particulates upon slurry pumps located downstream from said component, wherein said ramp device comprises:
- a base having a general curvature substantially matching a curvature of a portion of said interior liner upon which it is disposed;
- an upwardly inclined section operable for directing slurry flow in an upward direction away from said lower surface of said interior liner; and
- a pair of substantially vertical guide sections disposed on opposite sides of said upwardly inclined section for further directing slurry flow in an upward direction away from said lower surface of said interior liner.

10. The component according to claim 9, wherein said ramp device comprises
- an upwardly inclined and concave section operable for directing slurry flow in an upward direction away from said lower surface of said interior liner.

11. A ramp device disposed within a lower interior portion of a slurry transport system for directing slurry flow in an upward direction away from a lower interior surface of said slurry transport system, comprising an upwardly inclined section operable for directing slurry flow in an upward direction away from said lower interior surface of said slurry transport system, wherein said ramp device is affixed by suitable fasteners upon a lower interior surface of said slurry transport system.

12. A ramp device according to claim 11, wherein said ramp device is operable for re-suspending coarse solid particulates away from a lower portion of said slurry flow, thereby reducing wear associated with said coarse solid particulates upon slurry pumps located downstream from said ramp device.

13. A ramp device according to claim 11, wherein said ramp device further comprises a base having a general curvature substantially matching a curvature of a lower interior portion of said slurry transport system upon which it is disposed.

14. A ramp device according to claim 11, wherein said ramp device further comprises a pair of substantially vertical guide sections disposed on opposite sides of said upwardly inclined section for further directing slurry flow in an upward direction within said slurry transport system.

15. A method for reducing lower interior surface wear in a slurry transport system comprising:
- providing one or more ramp devices operable for directing slurry flow in an upward direction away from a lower interior surface of said slurry transport system; each of the one or more ramp devices comprising a pair of substantially vertical guide sections disposed on opposite sides of an upwardly inclined section;
- disposing said one or more ramp devices upon one or more locations along said lower interior surface of said slurry transport system; and
- transporting slurry through the slurry transport system across said one or more ramp devices.

16. The component according to claim 1, wherein said ramp device is tapered in its width for directing slurry flow upwardly and inwardly.

17. The component according to claim 9, wherein said ramp device is tapered in its width for directing slurry flow upwardly and inwardly.

18. The method according to claim 15, wherein said one or more ramp devices are tapered in its width for directing slurry flow upwardly and inwardly.

* * * * *